United States Patent
Ratha et al.

(10) Patent No.: US 11,741,753 B2
(45) Date of Patent: Aug. 29, 2023

(54) AUGMENTATION FOR VISUAL ACTION DATA

(71) Applicant: INTERNATIONAL BUSINESS MACHINES CORPORATION, Armonk, NY (US)

(72) Inventors: Nalini K. Ratha, Yorktown Heights, NY (US); Sharathchandra Pankanti, Fairfield County, CT (US); Lisa Marie Brown, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 17/533,770

(22) Filed: Nov. 23, 2021

(65) Prior Publication Data

US 2023/0162532 A1 May 25, 2023

(51) Int. Cl.
| | | |
|---|---|---|
| *G06K 9/00* | (2022.01) | |
| *G06N 3/08* | (2023.01) | |
| *G06V 40/20* | (2022.01) | |
| *G06V 10/75* | (2022.01) | |
| *G06V 10/82* | (2022.01) | |

(52) U.S. Cl.
CPC .......... *G06V 40/23* (2022.01); *G06V 10/7553* (2022.01); *G06V 10/82* (2022.01)

(58) Field of Classification Search
CPC ..... G06V 40/23; G06V 10/82; G06V 10/7553
See application file for complete search history.

(56) References Cited

U.S. PATENT DOCUMENTS

| | | | |
|---|---|---|---|
| 8,744,121 B2 | 6/2014 | Polzin et al. | |
| 9,514,353 B2 | 12/2016 | Zhang et al. | |
| 9,818,226 B2 | 11/2017 | Chu et al. | |
| 10,482,613 B2 | 11/2019 | Radwin et al. | |
| 2005/0286767 A1 | 12/2005 | Hager et al. | |
| 2012/0288186 A1* | 11/2012 | Kohli | G06V 10/772 382/159 |
| 2016/0171744 A1 | 6/2016 | Rhoads et al. | |
| 2017/0019605 A1 | 1/2017 | Ahiska | |

OTHER PUBLICATIONS

Casella, Enrico, et al., "Hierarchical syntactic models for human activity recognition through mobility traces," Personal and Ubiquitous Computing, Aug. 2020, pp. 451-464, 24,4.
Nobrega, Rui, et al., "Interactive 3D content insertion in images for multimedia applications," Multimedia Tools and Applications, Jan. 2017, pp. 163-197, 76, 1.
Mell, Peter, et al., "The NIST Definition of Cloud Computing," Sep. 2011, 7 pages.

* cited by examiner

*Primary Examiner* — David F Dunphy
(74) *Attorney, Agent, or Firm* — Tutunjian & Bitetto, P.C.; Daniel Morris

(57) ABSTRACT

Generating visual data by defining a first action into a first set of objects and corresponding first set of motions, and defining a second action into a second set of objects and corresponding second set of motions. A relationship is then determined for the second action to the first action in terms of relationships between corresponding constituent objects and motions. Objects and motions are detected from visual data of first action. Visual data is composed for the second action from the data by transforming the constituent objects and motions detected in first action based on the corresponding determined relationships.

20 Claims, 8 Drawing Sheets

AUGMENTATION FOR VISUAL ACTION DATA

STATEMENT REGARDING FEDERALLY SPONSORED RESEARCH OR DEVELOPMENT

This invention was made with Government support under CONTRACT NUMBER: D17PC00341 awarded by Advanced Research Development Agency. The Government has certain rights in this invention.

BACKGROUND

The present disclosure generally relates to video data analysis, and more particularly to augmenting video data for machine learning applications.

Augmenting image and video data is a feature for enhancing machine learning applications. Image augmentation is the process of increasing the size of the training data using images that already exist in the training set. There are two main families for image augmentation: basic image manipulation and deep learning approaches using generative adversarial network (GAN) augmentation, style transfer, and adversarial training. There are five main techniques of image transformations that can be used to increase the size of the data, which can include geometric transformations, color space transformations, random erasing, kernel filters, and mixing images.

Augmenting image and video data is especially helpful when the amount of available original data with labels is in scant supply. The existing methods of augmentation for image/video being used extensively are not sufficient, especially, when new constraints need to be learnt from the original data. For example, rotating and scaling may not provide any new insights to a machine learning algorithm.

SUMMARY

In accordance with one aspect of the present disclosure, a computer-implemented method is described for generating visual data. In one embodiment, the computer-implemented method can include defining a first action into a first set of objects and corresponding first set of motions; and defining a second action into a second set of objects and corresponding second set of motions. The method may further include determining a relationship of the second action to the first action in terms of relationships between corresponding constituent objects and motions; and detecting objects and motions from visual data of the first action from a digital image. In one embodiment, the computer-implemented method further includes composing visual data for the second action from the data by transforming the constituent objects and motions detected in first action based on the relationships between corresponding constituent objects and motions.

In another embodiment, a system for data augmentation to train an artificial intelligence model is described that includes a hardware processor; and a memory that stores a computer program product. The computer product when executed by the hardware processor, causes the hardware processor to define a first action into a first set of objects and corresponding first set of motions; and define a second action into a second set of objects and corresponding second set of motions. The system can also determine a relationship of the second action to the first action in terms of relationships between corresponding constituent objects and motions; and detect objects and motions from visual data of the first action from a digital image. In some embodiments, the system can also compose visual data for the second action from the data by transforming the constituent objects and motions detected in first action based on the relationships between corresponding constituent objects and motions.

In yet another embodiment, a computer program product is described for data augmentation to train an artificial intelligence model. The computer program product includes a computer readable storage medium having computer readable program code embodied therewith. The program instructions executable by a processor to cause the processor to define a first action into a first set of objects and corresponding first set of motions; and define a second action into a second set of objects and corresponding second set of motions. The computer program product can also determine, using the processor, a relationship of the second action to the first action in terms of relationships between corresponding constituent objects and motions; and detect, using the processor, objects and motions from visual data of the first action from a digital image. The computer program product can also compose, using the processor, visual data for the second action from the data by transforming the constituent objects and motions detected in first action based on the relationships between corresponding constituent objects and motions.

BRIEF DESCRIPTION OF THE DRAWINGS

The following description will provide details of preferred embodiments with reference to the following figures wherein.

DETAILED DESCRIPTION

The present invention generally relates to data enhancement as used in artificial intelligence modeling, e.g., a cognitive smart data augmentation for visual action data. Image augmentation is the process of increasing the size of the training data using images that already exist in the training set. In deep learning applications, quality and quantity of training data can make an impact on the performance of the application. Expanding the data set by data augmentation methods does not require additional labels. In action recognition, researches and practitioners generally operate with a small amount of training data, because annotation is an expensive and time consuming step. Example action recognition tasks that are opposite of each other may include: 1) entering a building vs. exiting a building; 2) climbing up the stairs vs. climbing down the stairs; 3) opening a car door vs. closing a car door, etc. In some embodiments, a reversing of the video frames works to expand the training data set. However, it has been determined that in tasks, such as entering a building, reversing the frames does not work.

In some embodiments, the methods, systems and computer program products that are described herein provide solutions to extend the video frame reversal cognitively. First, the methods, systems and compute program products can find the objects of interest, e.g., a person, animal, etc. In reverse video's, the objects are also located. Objects may be replaced randomly within a class for illumination, pose and occlusion. Random means that the augmented images are not necessarily the same subject as the original images in the data set. For example, when the object is a human, the augmented images do not have to employ images of the same human. The subject can be random. Occlusion is an obstructed view, or occultation, of an object in three-dimensional space when line of sight is blocked by an intervening object. In one example, when the object class is human, the method can pay particular attention to the age, e.g., age group, corresponding to the object, and the gender of the object. In some example, the face of the human object may be visible, and the methods, systems and computer program products may analyze the facial expression of the subject being observed by mechanisms for recording digital video.

In a different embodiment, using multiple frame segmented objects, a three dimensional model is built. Using the three dimensional model, for each frame, the pose is computed, as well as illumination and occupation. Thereafter, the object is rotated 180 degrees about y-axis for providing two action points for data, e.g., the original action data point and the rotated data action point.

The method, systems and computer program products of the present disclosure are now described in greater detail with reference to FIGS. 1-8.

Figure 1:
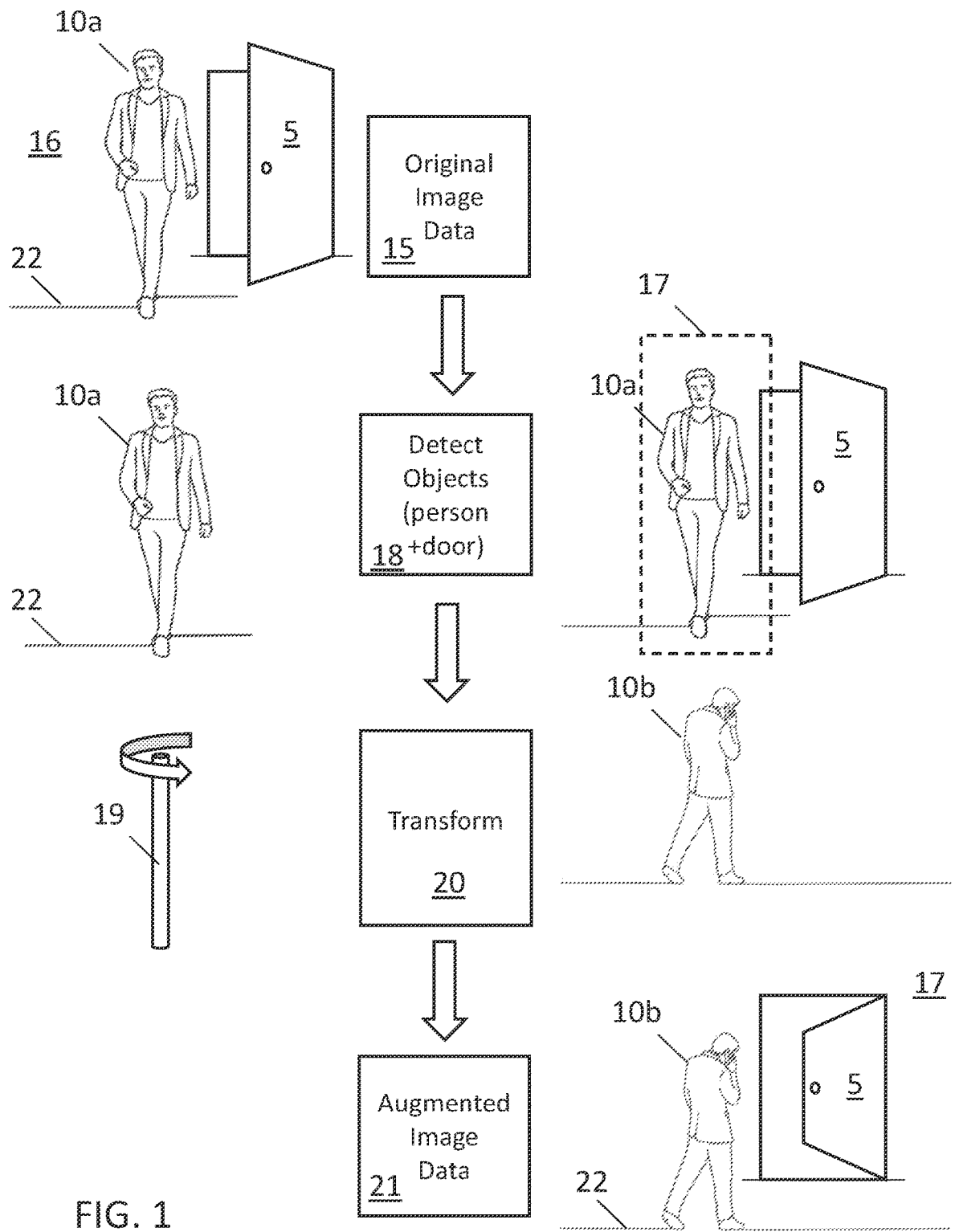
FIG. 1 is an illustration of an example environment in which cognitive smart data augmentation is applied to augment visual action data.
Figure 2:
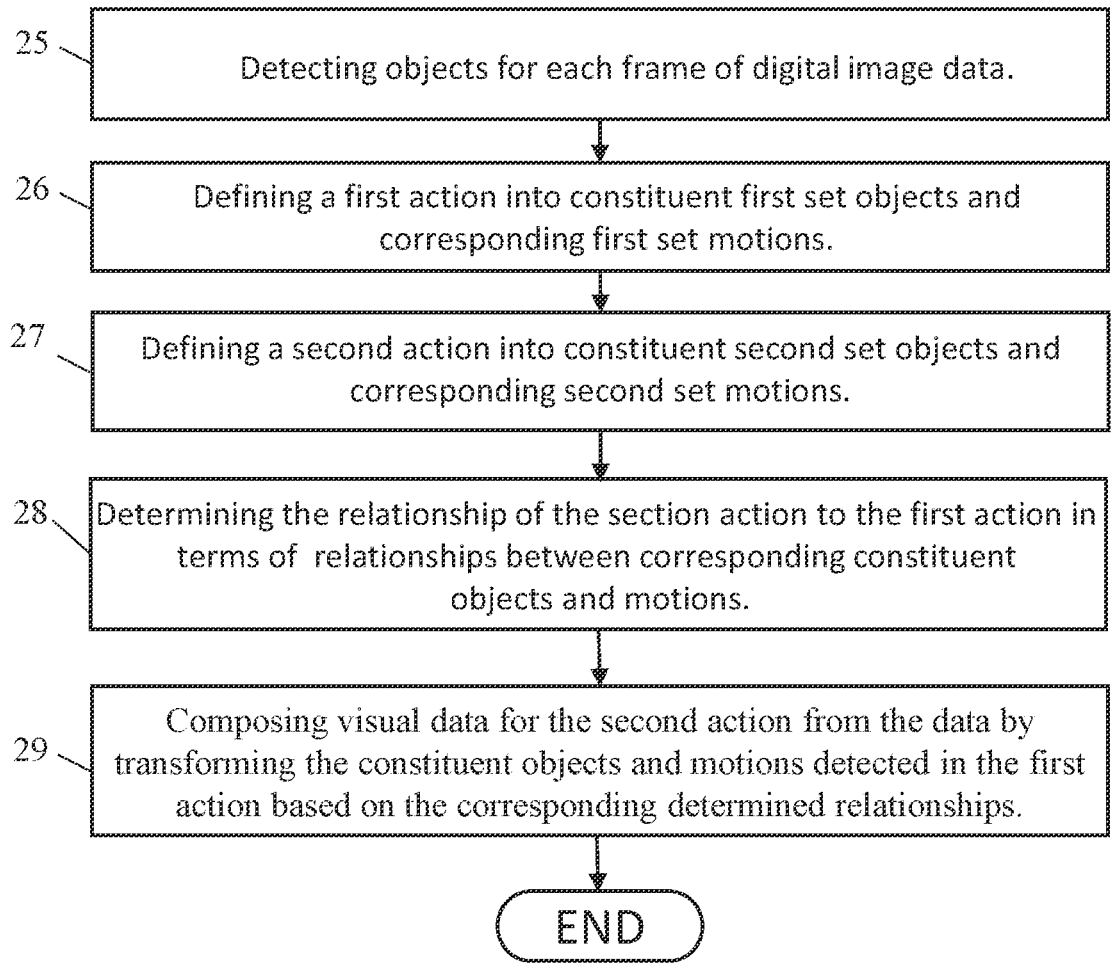
FIG. 2 is a block/flow diagram illustrating a method for data augmentation for vision action data, in accordance with one embodiment of the present disclosure.
Figure 3:
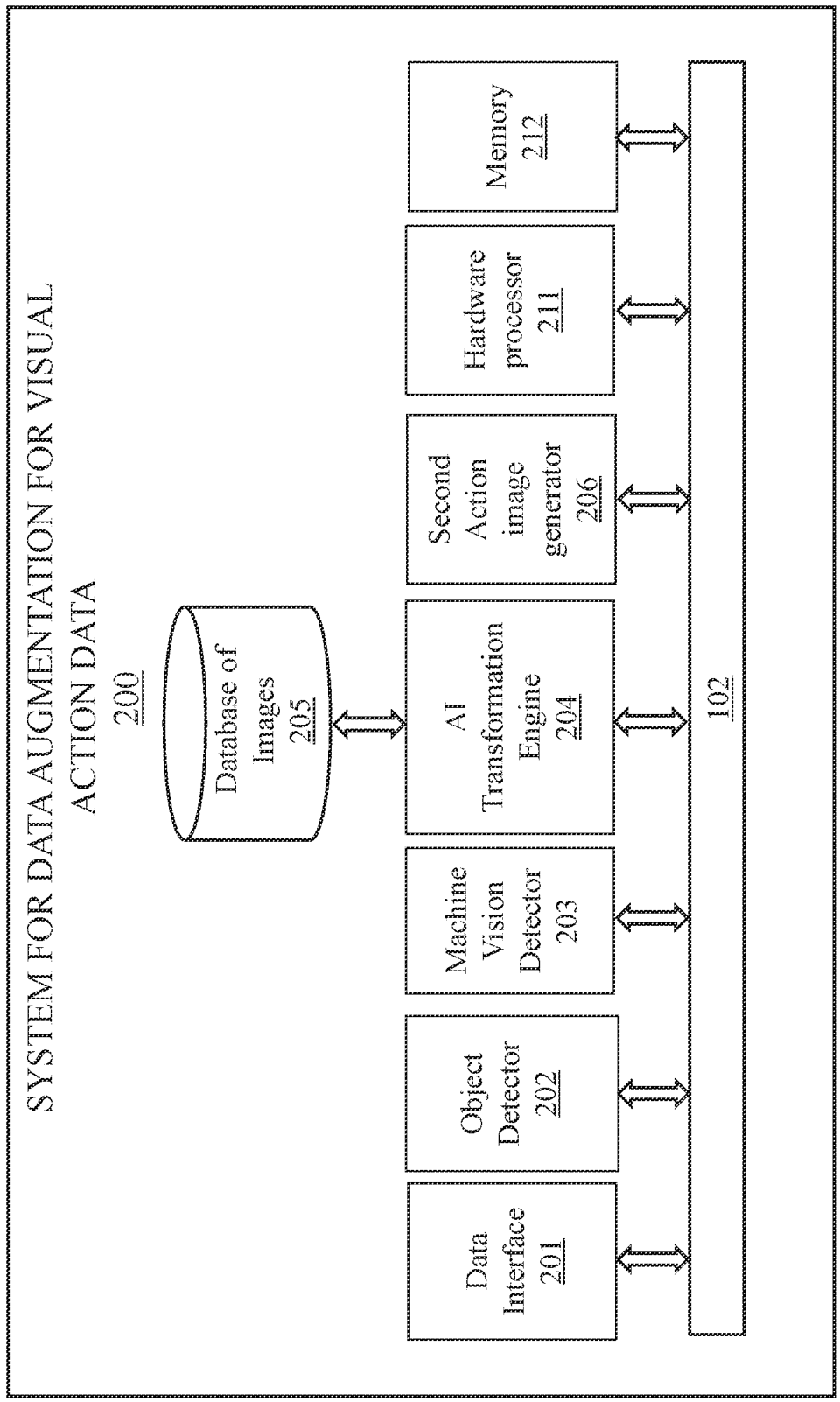
FIG. 3 is a block diagram illustrating a system for performing data augmentation for vision action data, in accordance with one embodiment of the present disclosure.

FIG. 1 is an illustration of an example environment in which the methods and systems of the present disclosure may be applied for providing data augmentation for vision action data. FIG. 2 is a block/flow diagram illustrating a method for data augmentation for vision action data. FIG. 3 is a block diagram illustrating a system, which may be employed in the method depicted in FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The methods, systems and computer program products that are described herein provide for data augmentation in scenarios in which the labeled original data set for visual action data is limited. There are activities that are observed using digital video that can be characterized as being opposites of one another. For example, the opposite of the activity for "entering a door" is "exiting a door". The opposite activity for "entering a car" is "exiting a car". The opposite activity for "receiving a box" is "giving a box". The opposite activity for taking a "left turn" is making a "turn". It is noted that the above examples are provided for illustrative purposes only. It is not intended that the above examples be limiting. However, generally in a data set, e.g., a visual data set, data is provided for a first activity, and data is not provided for the opposing second activity. In some instances, a data point for a second activity can not be achieved by reversing the images form the first activity.

FIG. 1 illustrates one example of data augmentation to increase a data set for visual data. In this example, images of the first activity that cannot be reversed to provide data for an opposing activity are considered. FIG. 1 illustrates a digital image 15 of a person 10a walking through a door 5. The perspective for the digital image is that viewing a person entering a room by walking through the door 5. The example of the digital image 15 depicted in FIG. 1 is that of "entering a door" 16. As noted, the opposite of entering a door is "exiting a door" 17. The example depicted in FIG. 1 includes augmenting the visual data to provide augmented data image 20 of "exiting a door" 17.

FIG. 2 is a block/flow diagram illustrating a method for data augmentation for vision action data. The method may begin at block 25, which includes using object detection for each frame of digital image data 15. The digital image data 15 may be provided from digital video. Digital video is an electronic representation of moving visual images (video) in the form of encoded digital data. This is in contrast to analog video, which represents moving visual images in the form of analog signals. Digital video comprises a series of digital images displayed in rapid succession. The digital video may be provided using any standard of video, such as CCIR 601, MPEG-4, MPEG-2, MPEG-1, H.261, H.263, H.264, Theora and combinations thereof.

FIG. 3 is a block diagram illustrating a system 200 for performing data augmentation for visual data action. The system 200 may include a visual data interface 201, which may provide the input for the frames of digital images, e.g., digital video.

Referring back to block 25 of FIG. 2, the objects being detected from each frame of digital images may be people 10a (human), animals, vehicles, furniture, devices (e.g., electronic devices), architectural features, etc. It is noted that the aforementioned examples of objects are provided for illustrative purposes only, and are not intended to be limited thereto. In the example depicted in FIG. 1, the object may be a person 10a. In the example depicted in FIG. 1, in addition to the person 10a, the door 5 may also be an object.

The objects may be detected from the frames of the digital image data using image detecting methods that can include at least one of post processing, 3D convolutions, recurrent neural networks, multi-frame aggregation, sparse propagation and combinations thereof.

Referring to FIG. 3, in some embodiments to detect objects from the frames of the digital image data, the system 200 for data augmentation for visual data action may include an object detector 202 that is in communication with the visual data interface 201 for receiving input data. The object detector 202 may employ at least one of post processing, 3D convolutions, recurrent neural networks, multi-frame aggregation, sparse propagation and combinations thereof to detect objects, such as the person 10a depicted in FIG. 1.

The method depicted in FIG. 2 may continue to define a first action into a constituent first set of objects and a first set of motions at block 26. The first action for the example depicted in FIG. 1 is "entering a door" 16. The constituent first set of objects may be a human 10a and the door 5. The first set of motions may be the human 10a walking through the opening of the door 5.

In one embodiment, defining the first action into a constituent first set of objects and a first set of motions may employ artificial intelligence utilizing computer software programs that analyze the images using machine vision. Machine vision is a series of algorithms, or mathematical procedures, which work like a flow-chart or series of questions to compare the object seen with stored reference images of objects in different angles, positions and movements. Many other questions are possible, such as the degree to which the object is reflective, the degree to which it is steady or vibrating, and the smoothness with which it moves. Combining all of the values from the various questions, an overall ranking is derived which gives the A.I. the probability that objects and motions match a known definition for these elements. This type of A.I. is known as "rule-based". Referring to FIG. 3, in some embodiments, the system 200 for data augmentation for visual data action may include a machine vision based object and motion detector 203 for performing the functions described in block 26 of FIG. 2.

FIG. 1 illustrates detecting 18 the objects. In the example depicted in FIG. 1, the object is the person 10a. However, the object to be identified may also be the door 5. In some embodiments, object detection includes detection of locations, shapes, and textures of the objects. As noted, the detection of motions of objects is also measured. Detection of motions implies detection of displacement of the object and their respective parts over time.

The object detection of the original image data 15 may include detection in each from two opposite actions. In the example depicted in FIG. 1, the original image data 15 is of an action of exiting a door. The opposite of "exiting a door" is "entering a door". In this example, the first action is "exiting a door" 16, whereas the second action is "entering a door" 17. In FIG. 2, a transformation stage 20 may help to provide for the second action.

Referring to FIG. 2, in some embodiments, the method may include defining the relationship of a second action into a constituent second set of objects and corresponding second set of motions at block 27. Referring to FIG. 1, in some embodiments, defining the second action can include rotating the object 10a of the original image data 15. For example, the person 10a that provides the object 10a of the original image data 15 may be rotated 180 degrees around a Y-axis 19. As noted in some embodiments, visual data may not be available for a second action correlated to the original image data 15. For example, although in some instances reversing a video can provide the second action, this is not always the case. In the instances, in which reversing a video is not suitable for providing a second action, the methods, system and computer program products of the present disclosure can provide this cognitively.

More specifically, the system can first classify the objects of interest from object detection of the original image data 15. In the example, depicted in FIG. 1, the object of interest is a human 10a. The object detected is a forward facing human 10a. To provide the second action for data augmentation, the system transforms the forward facing human 10a to a rear facing human 10b, in which the rear facing human 10b is moving in a direction towards an open door 5. By providing a rear facing human 10b moving in direction towards an open door 5, the system can provide a second action of "entering a door" 17.

Referring to FIG. 3, the system 200 for data augmentation for visual action data may include an artificial intelligence (AI) based transformation engine 204. The artificial intelligence (AI) based engine 204 can use machine vision to extract from the original image data 15 the object 10a, and can then determine that the object is a first action that has an opposing second action. The artificial intelligence based transformation engine 204 can also detect the door as a second object, and can then distinguish that the motion of the first object 10a relative to the second object 15 can have an opposing motion related to the second action.

First, the object 10a may be classified. In the example depicted in FIG. 1, the object 10a is a human. The artificial intelligence (AI) based transformation engine 204 can have access to a database of comparative image data 205. By characterizing the object 10a, the system can select data-based of comparative images having particular relevance.

As noted, the artificial intelligence (AI) based transformation engine 204 can determine that the object 10a has a motion relative to the second object, e.g., the door. This can be interpreted as a source action of interest. For example, the object 10a may be "entering a structure" or "leaving a structure".

In the example depicted in FIG. 1, the original image data 15 may be an example of a source of action for entering a structure. The source action can be broken down into constituent objects, and their interactions both spatially and temporally in terms of simpler actions and poses of the objects. For example, for a source action of "enters a structure" can have objects such as the person 10a and the structure 22. The interactions can be "move toward structure" and "person pose facing structure". Other spatial observations detected by the artificial intelligence (AI) based transformation engine 204 can include "person crosses the structure" and "person end position is closer to center of scene than the start position".

This above characterizations may be for the first action, i.e., "exits a door" or "enters a structure". From those characterizations, the artificial intelligence (AI) based transformation engine 204 can transform the data to provide the second action, which is opposite the first action. The second action may be referred to as a target action. If the source action was "enters a structure", the target action may be "leaves a structure". From the target action, the artificial intelligence (AI) based transformation engine 204 can break the section action into constituent objects, and their interactions both spatially and temporally in terms of simpler actions and poses of the objects.

For example, the target action can be broken down into constituent objects, and their interactions both spatially and temporally in terms of simpler actions and poses of the objects. For example, for a target action of "exits a structure" can have objects such as the person 10b and the structure 22. The interactions can be "move away from structure" and "person pose facing away". Other spatial observations detected by the artificial intelligence (AI) based transformation engine 204 can include "person crosses the structure".

Using the constituents noted above, the artificial intelligence (AI) based transformation engine 204 can transform the data to provide the second action. As noted above, the artificial intelligence (AI) based transformation engine 204 can have access to a database of comparative image data 205. By characterizing the object 10a, the system can select databased of comparative images having particular relevance.

To provide data for the second action, the artificial intelligence (AI) based transformation engine 204 searches the database of comparative image data 205 for images of an object, e.g., human, which is in a state for "exits a structure". Interactions, such as "move away from structure" and "person pose facing away" may also be used by the artificial intelligence (AI) based transformation engine 204 to extract data from the database of comparative image data 205 in providing an augmented section action that is opposite the first action, which when combined with the first action provides for augmenting visual action data.

Figure 4:
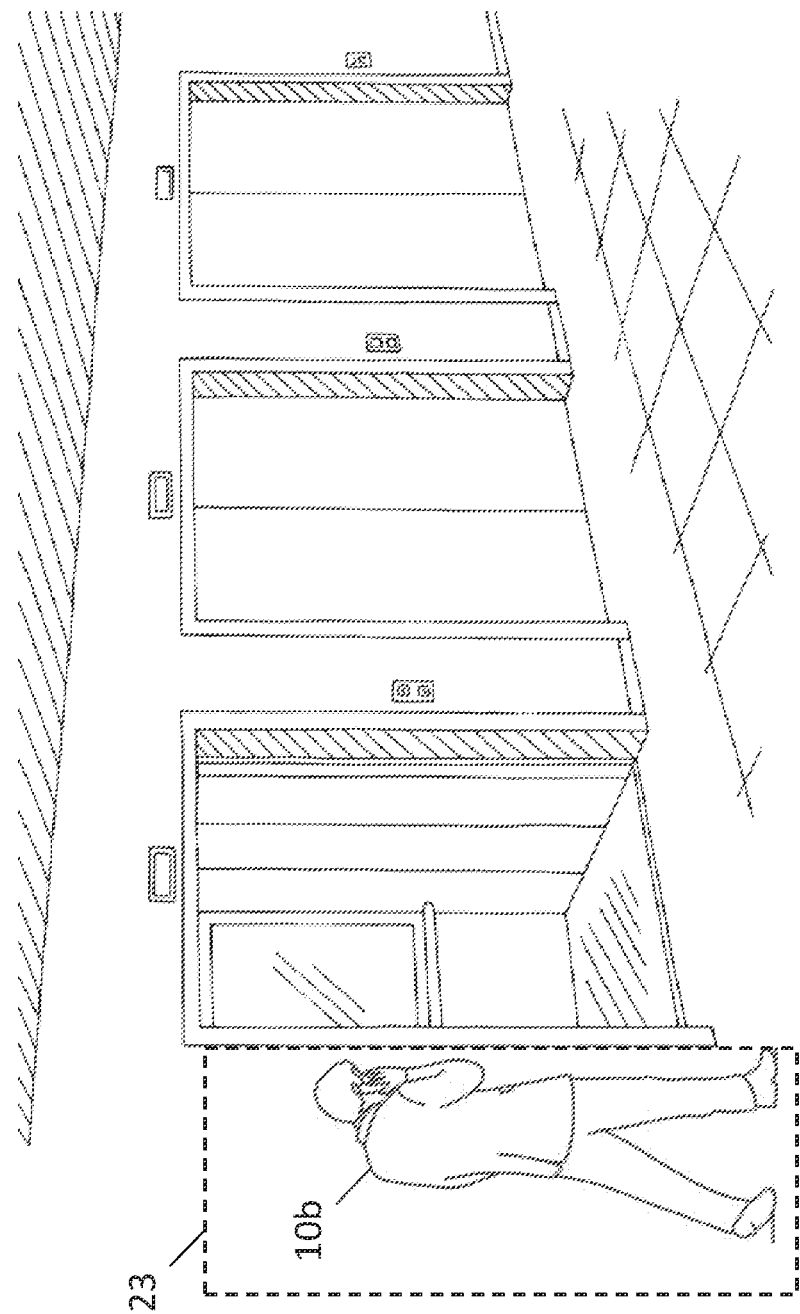
FIG. 4 is an illustration of a comparative data image used for providing an opposite action of the original data image, in accordance with one embodiment of the present disclosure.

FIG. 4 is one example of a comparative image that may be available in the comparative image data 205. The image is of a person with a pose of "facing away". The person 10b also exiting a structure. Although the image is of a person exiting the structure by walking to an elevator, the person is walking away from the perspective from which the image is taken. Further, the person 10b is in a facing away pose and moving in a direction opposite the person 10a in the original image data 15.

For the example, depicted in FIG. 1, the artificial intelligence (AI) based transformation engine 204 searches the database of comparative image data 205 for a match, and extracts 24 the matching image, such as the portion of the image of the person 10b in FIG. 4 that is in a pose and moving in a direction opposite the person 10a in the original image data 15. In selecting the matching image, when the object is a human 10a, 10b, it can be desirable to select a replacement image of the same age and gender to avoid incompatible actions for supplementing the first action with the supplemental second action. In selecting the matching image, the artificial intelligence (AI) based transformation engine 204 can also consider the facial expression of the subject 10a, and considers that data when selecting the object 10b for the second action.

The artificial intelligence method used to perform the functions of the artificial intelligence (AI) based transformation engine 204 can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida—Pineda recurrent backpropagation, ALOPEX, backpropagation, bootstrap aggregating, CN2 algorithm, constructing skill trees, dehaene—changeux model, diffusion map, dominance-based rough set approach, dynamic time warping, error-driven learning, evolutionary multimodal optimization, expectation—maximization algorithm, fastICA, forward—backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde—Buzo—Gray algorithm, local outlier factor, logic learning machine, LogitBoost, manifold alignment, minimum redundancy feature selection, mixture of experts, multiple kernel learning, nonnegative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state—action—reward—state—action, stochastic gradient descent, structured kNN, T-distributed stochastic neighbor embedding, temporal difference learning, wake-sleep algorithm, weighted majority algorithm (machine learning) and combinations thereof.

Still referring to FIG. 1, the extracted image 24 of the person 10b in a facing away pose and moving in a direction opposite the person 10a in the original image data 15, may be combined with a door image to provide the second action, i.e., "exiting a door" 17. This is one example of augmented image data 21. The composite image may be generated by a section image generated 206, which can provide a display interface for visually confirming the image for the second action. The example described above employing the images in the database of images 205 is only one embodiment for providing the second action. In another embodiment, the artificial intelligence (AI) transforming engine 204 can provide that the second action uses multiple frame segmented objects to build a 3-D model. For each frame, the pose is computed, as well as the illumination and the occultation. Using the model, the image may be rotated about the y-axis 19 to provide the second action.

In some embodiments, the composite image is added to the data set, e.g., data for the second action is added to the original data section including images for the first action.

In some embodiments, the use of appropriate data enhancement methods can increase the number of datasets by more than ten times, thereby maximizing the use of each sample in a small sample set, while improving the robustness of the model and preventing overfitting during training, so that the training can get a better machine learning model. The image provided by the second action is added to the data set including the first action. The data set may then be used to train an artificial intelligence model, e.g., an artificial intelligence model employing a neural network.

Figure 5:
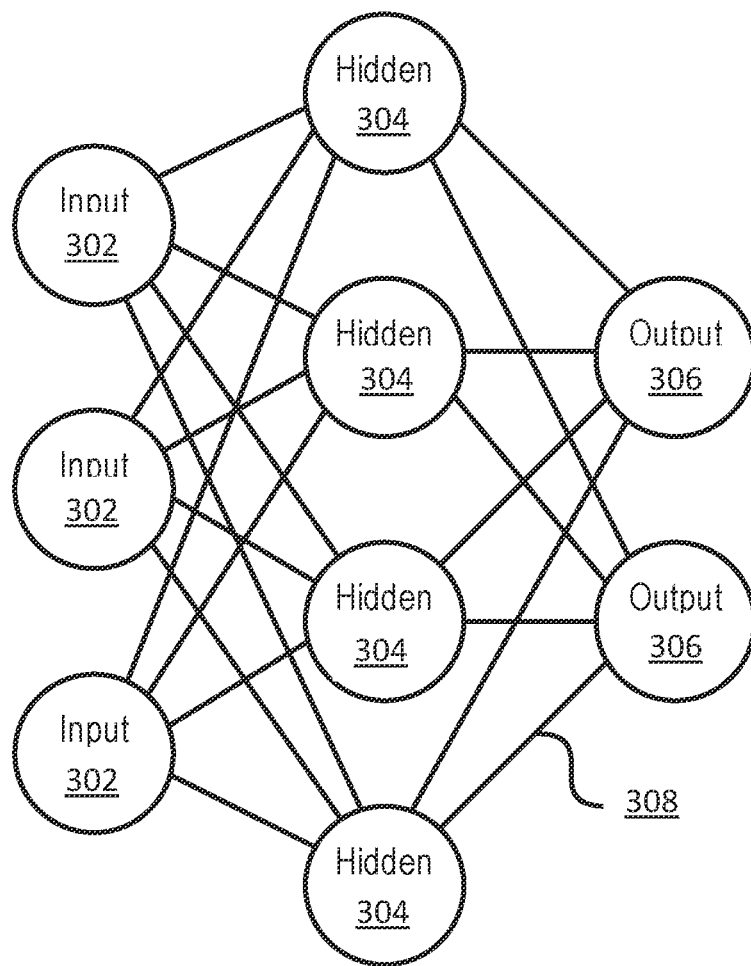
FIG. 5 is a generalized diagram of a neural network.

Training of the artificial intelligence model can be described with reference to the neural network of FIG. 5. FIG. 5 depicts a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known to have input neurons 302 that provide information to one or more "hidden" neurons 304.

Connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The training data has been augmented using the methods and systems that has been described with reference to FIGS. 1-4.

The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead.

In the present case the output neurons 306 provide analysis of an image in a machine learning application.

To train an ANN, training data can be divided into a training set and a testing set. The training data includes pairs of an input and a known output. The training data has been augmented using the methods and systems that has been described with reference to FIGS. 2 and 3. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 308 may be characterized as a weight value that is stored in a computer memory, and the activation function of each neuron may be implemented by a computer processor. The weight value may store any appropriate data value, such as a real number, a binary value, or a value selected from a fixed number of possibilities, which is multiplied against the relevant neuron outputs. Alternatively, the weights 308 may be implemented as resistive processing units (RPUs), generating a predictable current output when an input voltage is applied in accordance with a settable resistance.

Applications for the augmented data in training artificial intelligence models include autonomous vehicle driving, sports, E-sports, surveillance, safety/healthcare, etc.

FIG. 3 illustrates one embodiment of a system for data augmentation for visual action data 200 that includes a hardware processor 211; and a memory 212 that stores a computer program product. The computer program product when executed by the hardware processor 111, causes the hardware processor 211 to define a first action into a first set of objects and corresponding first set of motions, and define a second action into a second set of objects and corresponding second set of motions. The system can also determine a relationship of the second action to the first action in terms of relationships between corresponding constituent objects and motions; and detect objects and motions from visual data of the first action from a digital image. The system can also compose visual data for the second action from the data by transforming the constituent objects and motions detected in first action based on the relationships between corresponding constituent objects and motions.

To provide the above, the system 100 can include a data interface 201, object detector 202, a machine vision detector 203, an AI transformation engine 204 and a second action image generator 206, which may be integrated into the hardware processor 211 and the memory 212 by the bus 102. Further, the data augmentation system 200 depicted in FIG. 3 can be integrated via bus 102 into the processing system 400 depicted in FIG. 6. The processing system 400 includes at least one processor (CPU) 104 (also referred to as hardware processor) operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components as will be described herein.

As employed herein, the term "hardware processor subsystem" or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
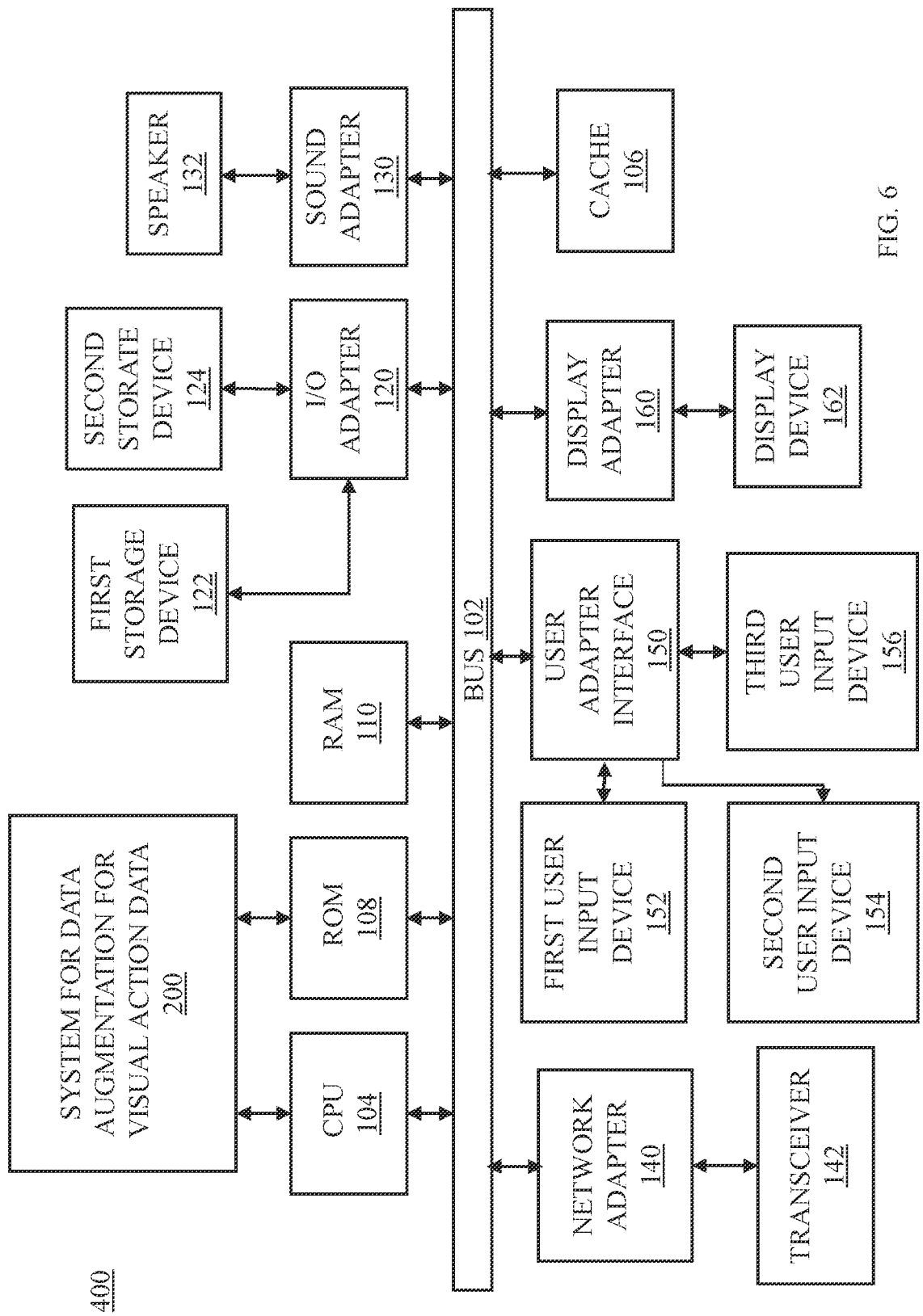
FIG. 6 is a block diagram illustrating a system that can incorporate the data augmentation engine that is depicted in FIG. 3, in accordance with one embodiment of the present disclosure.

The system 400 depicted in FIG. 6, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. For example, the present disclosure provides a computer program product including a non-transitory computer readable storage medium having computer readable program code embodied therein for training an artificial intelligence model. The computer program product includes a computer readable storage medium having computer readable program code embodied therewith, the program instructions executable by a processor to cause the processor to define, using the processor, a first action into a first set of objects and corresponding first set of motions; and define, using the processor, a second action into a second set of objects and corresponding second set of motions. The computer program product can also determine, using the processor, a relationship of the second action to the first action in terms of relationships between corresponding constituent objects and motions. The computer program product can also detect, using the processor, objects and motions from visual data of the first action from a digital image. In some embodiments, the computer program product can also compose, using the processor, visual data for the second action from the data by transforming the constituent objects and motions detected in first action based on the relationships between corresponding constituent objects and motions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
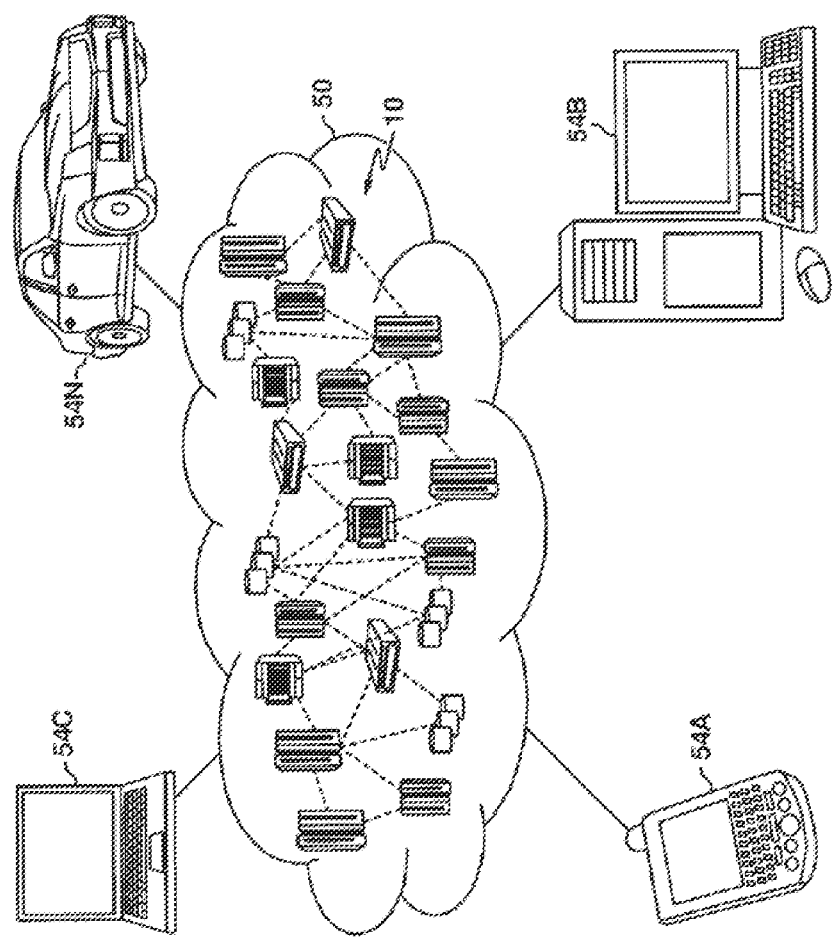
FIG. 7 depicts a cloud computing environment according to an embodiment of the present disclosure.

Referring now to FIG. 7, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 51 and cloud computing environment 50 can communicate with any type of computerized device over any type of network and/or network addressable connection (e.g., using a web browser).

Figure 8:
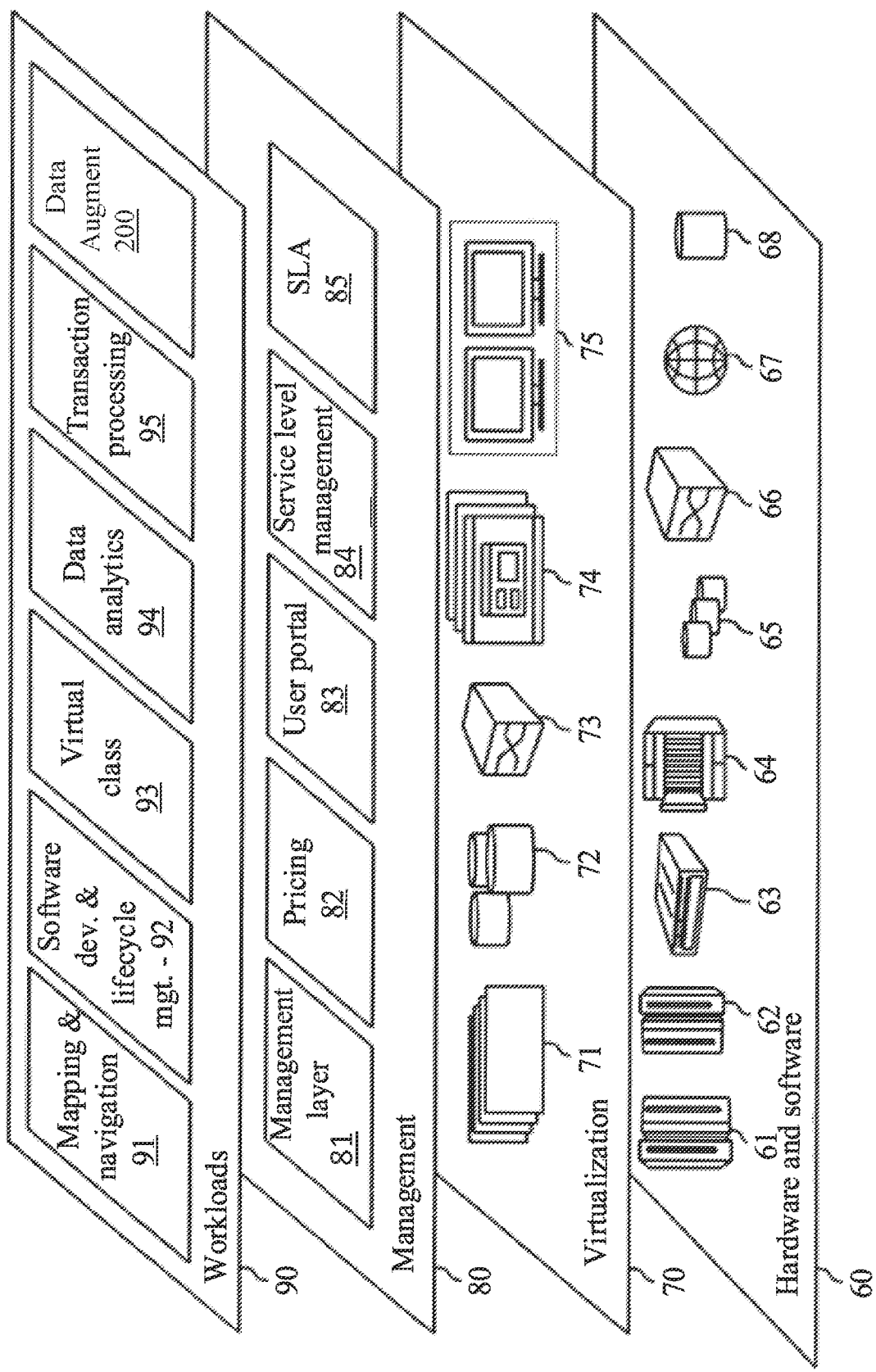
FIG. 8 depicts abstraction model layers according to an embodiment of the present disclosure.

Referring now to FIG. 8, a set of functional abstraction layers provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data augmentation engine 200, which is described with reference to FIGS. 1-8.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of methods, systems and computer program products for augmentation for visual action data it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating visual data comprising:
   defining a first action into a first set of objects and corresponding first set of motions;
   defining a second action into a second set of objects and corresponding second set of motions;
   determining a relationship of the second action to the first action in terms of relationships between corresponding constituent objects and motions;
   detecting objects and motions from visual data of the first action from a digital image; and
   composing visual data for the second action from the data by transforming the constituent objects and motions detected in first action based on the relationships between corresponding constituent objects and motions.

2. The computer-implemented method of claim 1, wherein detection of objects from the visual data of the first action includes detection of a geometric characteristic of the objects selected from the group consisting of locations of the objects, shapes of the objects, textures of the objects and combinations thereof.

3. The computer-implemented method of claim 1, wherein detection of motions from the visual data of the first action includes detection of displacement of the object and their respective parts over time.

4. The computer-implemented method of claim 1, wherein the transforming of objects is a geometrical transformation selected from the group consisting of displacement, rotation and combinations thereof.

5. The computer-implemented method of claim 1, wherein the first action and the second action are opposite one another.

6. The computer-implemented methods of claim 1, wherein the composing the visual data comprises matching the second set of objects and the corresponding set of motions to at least element extracted from a comparative digital image from a database of images.

7. The computer-implemented method of claim 1, wherein the composing the visual data comprises developing a three dimensional model including data from the first action, and rotating objects for the first action in the three dimensional model about a y-axis to provide the second action.

8. A system for data augmentation to train an artificial intelligence model comprising:
a hardware processor; and
a memory that stores a computer program product, which, when executed by the hardware processor, causes the hardware processor to:
define a first action into a first set of objects and corresponding first set of motions;
define a second action into a second set of objects and corresponding second set of motions;
determine a relationship of the second action to the first action in terms of relationships between corresponding constituent objects and motions;
detect objects and motions from visual data of the first action from a digital image; and
compose visual data for the second action from the data by transforming the constituent objects and motions detected in first action based on the relationships between corresponding constituent objects and motions.

9. The system of claim 8, wherein detection of objects from the visual data of the first action includes detection of a geometric characteristic of the objects selected from the group consisting of locations of the objects, shapes of the objects, textures of the objects and combinations thereof.

10. The system of claim 8, wherein detection of motions from the visual data of the first action includes detection of displacement of the object and their respective parts over time.

11. The system of claim 8, wherein the transforming of objects is a geometrical transformation selected from the group consisting of displacement, rotation and combinations thereof.

12. The system of claim 8, wherein the first action and the second action are opposite one another.

13. The system of claim 8, wherein the composing the visual data comprises matching the second set of objects and the corresponding set of motions to at least element extracted from a comparative digital image from a database of images.

14. The system of claim 8, wherein the composing the visual data comprises developing a three dimensional model including data from the first action, and rotating objects for the first action in the three dimensional model about a y-axis to provide the second action.

15. A computer program product for data augmentation to train an artificial intelligence model, the computer program product comprising a computer readable storage medium having computer readable program code embodied therewith, the program instructions executable by a processor to cause the processor to:
define, using the processor, a first action into a first set of objects and corresponding first set of motions;
define, using the processor, a second action into a second set of objects and corresponding second set of motions;
determine, using the processor, a relationship of the second action to the first action in terms of relationships between corresponding constituent objects and motions;
detect, using the processor, objects and motions from visual data of the first action from a digital image; and
compose, using the processor, visual data for the second action from the data by transforming the constituent objects and motions detected in first action based on the relationships between corresponding constituent objects and motions.

16. The computer program product of claim 15, wherein detection of objects from the visual data of the first action includes detection of a geometric characteristic of the objects selected from the group consisting of locations of the objects, shapes of the objects, textures of the objects and combinations thereof.

17. The computer program product of claim 15, wherein detection of motions from the visual data of the first action includes detection of displacement of the object and their respective parts over time.

18. The computer program product of claim 15, wherein the transforming of objects is a geometrical transformation selected from the group consisting of displacement, rotation and combinations thereof.

19. The computer program product of claim 15, wherein the first action and the second action are opposite one another.

20. The computer program product of claim 15, wherein the composing the visual data comprises matching the second set of objects and the corresponding set of motions to at least element extracted from a comparative digital image from a database of images.

* * * * *